United States Patent
Köhler et al.

[11] Patent Number: 5,845,056
[45] Date of Patent: Dec. 1, 1998

[54] METHOD FOR GENERATING A SCREENED GRAY PROOF HAVING GRAY VALUES FROM A COLOR IMAGE

[75] Inventors: Thomas Köhler, Mücke; Klaus Lang, Bad Münster; Andreas Netthorn, Frankfurt, all of Germany

[73] Assignee: Linotype-Hell AG, Kiel, Germany

[21] Appl. No.: 737,287

[22] PCT Filed: Mar. 7, 1996

[86] PCT No.: PCT/DE96/00423

§ 371 Date: Jan. 9, 1997

§ 102(e) Date: Jan. 9, 1997

[87] PCT Pub. No.: WO96/27976

PCT Pub. Date: Sep. 12, 1996

[30] Foreign Application Priority Data

Mar. 8, 1995 [DE] Germany ............. 195 08 163.3

[51] Int. Cl.⁶ .................................................. H04N 1/46
[52] U.S. Cl. ................................... 395/109; 358/515
[58] Field of Search ................................. 395/101, 109; 358/515–516, 527, 534; 348/35

[56] References Cited

U.S. PATENT DOCUMENTS

| | | | |
|---|---|---|---|
| 4,703,318 | 10/1987 | Haggerty | 346/473 |
| 4,743,962 | 5/1988 | McCormick | 346/518 |
| 5,029,107 | 7/1991 | Lee | 358/75 |
| 5,220,417 | 6/1993 | Sugiura | 358/515 |
| 5,278,678 | 1/1994 | Harrington | 358/518 |
| 5,323,247 | 6/1994 | Parker et al. | 358/456 |
| 5,457,772 | 10/1995 | Shannon | 395/109 |
| 5,640,254 | 6/1997 | Sexton | 395/109 |

FOREIGN PATENT DOCUMENTS

| | | |
|---|---|---|
| 0 199 272 | 10/1986 | European Pat. Off. |
| 0 389 743 | 3/1990 | European Pat. Off. |
| 0 592 769 | 4/1994 | European Pat. Off. |
| WO93 21725 | 10/1993 | WIPO |

*Primary Examiner*—David K. Moore
*Assistant Examiner*—Stephen Brinich
*Attorney, Agent, or Firm*—Hill & Simpson

[57] ABSTRACT

A method and apparatus are provided for producing a rastered gray composite proof in which the color values of the chromatic printing inks "cyan", "magenta" and "yellow" are united to brightness-equivalent gray scale values for simple advance monitoring of a color printing. The gray scale values to be printed on the gray composite proof are corrected compared to the gray scale values of the chromatic printing inks for the color printing represented by the color separation values, being corrected to different percentage parts that respectively correspond to the subjectively sensed brightness impression of the chromatic printing inks relative to "black". The color separation values of the chromatic printing inks are converted into individual bit maps by different raster functions such that the recorded pixels of the chromatic printing inks lie next to one another on the recording material. The individual bit maps of the chromatic printing inks are united to form an overall bit map by an OR operation. The control bits of the overall bit map control a black-and-white printer that prints the gray composite proof on the recording material pixel-by-pixel, whereby the control bits of the overall bit map decide whether the pixel is printed as raster points or parts of the raster points or is not printed.

26 Claims, 11 Drawing Sheets

|    |    |    |    | 21 |    |    | 22 |
|----|----|----|----|----|----|----|----|
| 64 | 64 | 64 | 64 | 37 | 64 | 64 | 56 |
| 64 | 62 | 64 | 64 | 64 | 64 | 64 | 64 |
| 21 | 64 | 64 | 30 | 64 | 64 | 50 | 64 |
| 43 | 64 | 24 | 64 | 64 | 8  | 64 | 18 |
| 64 | 64 | 64 | 53 | 64 | 40 | 64 | 64 |
| 14 | 64 | 64 | 5  | 64 | 64 | 64 | 27 |
| 64 | 64 | 59 | 64 | 11 | 64 | 64 | 64 |
| 64 | 34 | 64 | 64 | 64 | 46 | 64 | 2  |

|    |    |    |    | 21 |    |    | 22 |
|----|----|----|----|----|----|----|----|
| 58 | 6  | 64 | 35 | 64 | 48 | 18 | 64 |
| 39 | 64 | 27 | 1  | 54 | 64 | 61 | 4  |
| 64 | 13 | 60 | 64 | 22 | 41 | 64 | 10 |
| 64 | 44 | 64 | 64 | 46 | 64 | 29 | 64 |
| 32 | 64 | 23 | 64 | 56 | 64 | 15 | 51 |
| 64 | 16 | 49 | 64 | 64 | 3  | 37 | 64 |
| 53 | 8  | 64 | 11 | 64 | 34 | 64 | 25 |
| 64 | 64 | 20 | 63 | 30 | 64 | 42 | 64 |

|    |    |    |    | 21 |    |    | 22 |
|----|----|----|----|----|----|----|----|
| 64 | 64 | 14 | 64 | 64 | 64 | 64 | 64 |
| 64 | 64 | 64 | 64 | 64 | 41 | 64 | 64 |
| 64 | 64 | 64 | 64 | 64 | 64 | 64 | 64 |
| 64 | 64 | 64 | 64 | 64 | 64 | 64 | 64 |
| 64 | 64 | 64 | 59 | 64 | 64 | 64 | 64 |
| 64 | 23 | 64 | 64 | 64 | 64 | 64 | 64 |
| 64 | 64 | 64 | 64 | 5  | 64 | 64 | 64 |
| 64 | 64 | 64 | 64 | 64 | 64 | 50 | 64 |
| 32 | 64 | 64 | 64 | 64 | 64 | 64 | 64 |

|   |   |   |   |   | 34 | 40 | 53 | 59 |
|---|---|---|---|---|----|----|----|----|
|   |   |   |   |   | 18 | 27 | 46 | 56 |
|   |   |   |   |   | 5  | 14 | 30 | 50 |
|   |   |   |   |   | 2  | 8  | 21 | 43 |
|   |   |   |   |   |    | 11 | 24 | 37 |
|   |   |   |   |   |    |    |    | 62 |
|   |   |   |   |   |    |    |    |    |
|   |   |   |   |   |    |    |    |    |

| 44 |    |    |    |    |    |    |    |
|----|----|----|----|----|----|----|----|
| 41 | 29 |    |    |    |    |    |    |
| 34 | 22 | 16 |    |    |    |    |    |
| 30 | 18 | 11 |    |    |    |    |    |
| 35 | 15 | 10 | 3  | 1  |    |    |    |
| 49 | 25 | 13 | 8  | 4  | 6  | 20 |    |
| 58 | 53 | 39 | 23 | 27 | 32 | 37 | 42 |
| 63 | 60 | 54 | 51 | 46 | 48 | 56 | 61 |

|   | 41 | 50 | 59 |   |   |   |   |
|---|----|----|----|---|---|---|---|
|   |    | 23 | 32 |   |   |   |   |
|   |    |    | 14 |   |   |   |   |
|   |    |    | 5  |   |   |   |   |
|   |    |    |    |   |   |   |   |
|   |    |    |    |   |   |   |   |
|   |    |    |    |   |   |   |   |
|   |    |    |    |   |   |   |   |

METHOD FOR GENERATING A SCREENED GRAY PROOF HAVING GRAY VALUES FROM A COLOR IMAGE

This application is a 371 of PCT/DE96/00423, filed Mar. 7, 1996, published as WO96/27976 Sep. 12, 1996.

BACKGROUND OF THE INVENTION

The invention is in the field of electronic reproduction technology and is directed to a method and to an apparatus for producing a rastered gray composite proof with a black-and-white recording device, for example a black-and-white printer, for advance monitoring of a color print. What is understood by gray composite proof is an advance impression called a proof in which the color values of the four color separations "cyan", "magenta", "yellow" and "black" are united to gray scale values equivalent to the brightness.

For exposing rastered color separations "cyan", "magenta", "yellow" and "black" for color printing with an electronic recording device, also called a recorder or exposer, color separation values for the individual color separations are first produced. The color separation values are then supplied to a raster generator in which they are converted according to a raster function to form a bit map whose control bits are used for the pixel-by-pixel activation and deactivation of an exposure beam in the exposer in the pixel-by-pixel and line-by-line recording of the rastered color separations. The rastered color separations serve for manufacturing the printing forms for the later color printing.

In practice, proofs are produced for advance monitoring of the anticipated result in the color printing. The production of simple, rastered color proofs occurs, for example, with a color copier that is preceded by a raster generator. Simple, rastered black-and-white proofs for the individual color separations are printed, for example, with a black-and-white printer that is likewise preceded by a raster generator.

The advance monitoring of the anticipated result of a color printing on the basis of simple black-and-white proofs for each color separation does not allow a definitive statement about the quality of the later color printing since the brightnesses on the printed black-and-white proof do not correspond to the brightness impression produced by the corresponding inks in the color printing.

SUMMARY OF THE INVENTION

It is therefore an object of the present invention to improve a method and an apparatus for producing a proof such that a reliable advance monitoring of the anticipated result in the color printing becomes possible on the basis of a rastered gray composite proof.

According to the method of the invention for producing a rastered gray composite proof for advanced monitoring of color printing of the color image, color separation values are generated of color separations "cyan", "magenta", "yellow" and "black" of a color image. A recording material is divided into pixels. The color separation values are converted according to a raster function into control bits in the form of a bit map allocated to the pixels. The proof is recorded pixel-by-pixel and line-by-line on the recording material, the control bits of the bit map determining during the recording whether the pixels are recorded or are not recorded as raster points or parts of a raster point. The gray scale values to be recorded on the gray composite proof are corrected to different percentage parts for the color printing compared to gray scale values of the chromatic printing inks "cyan", "magenta" and "yellow" represented by the color separation values, the different percentage parts respectively corresponding to a subjectively sensed brightness impression of the chromatic printing inks "cyan", "magenta" and "yellow" with reference to the printing ink "black". The color separation values of the chromatic printing inks "cyan", "magenta" and "yellow" are converted by different raster functions into three individual bit maps such that the recorded pixels of the chromatic printing inks "cyan", "magenta" and "yellow" lie next to one another on the recording material. The individual bit maps of the chromatic printing inks "cyan", "magenta" and "yellow" are united to form an overall bit map. The control bits of the overall bit map drive a black-and-white recording device with the control bits of the overall bit map for recording the gray composite proof in which the color values of the chromatic printing inks "cyan", "magenta" and "yellow" are united to brightness-equivalent gray scale values.

In an apparatus for producing a raster gray composite proof according to the invention for advance monitoring of the color printing of the color image, raster generators are provided for generating individual bit maps for the printing inks "cyan", "magenta", "yellow" and "black" from the color separation values according to different raster functions. Bit map memories are connected to the raster generators for deposit of the individual bit maps. A logic stage is provided for uniting the individual bit map to form an overall bit map. A black-and-white recording device follows the logic stage for recording the raster gray composite proof.

The invention is explained in greater detail below with reference to FIGS. 1 through 19.

DESCRIPTION OF THE PREFERRED EMBODIMENTS

Figure 1:
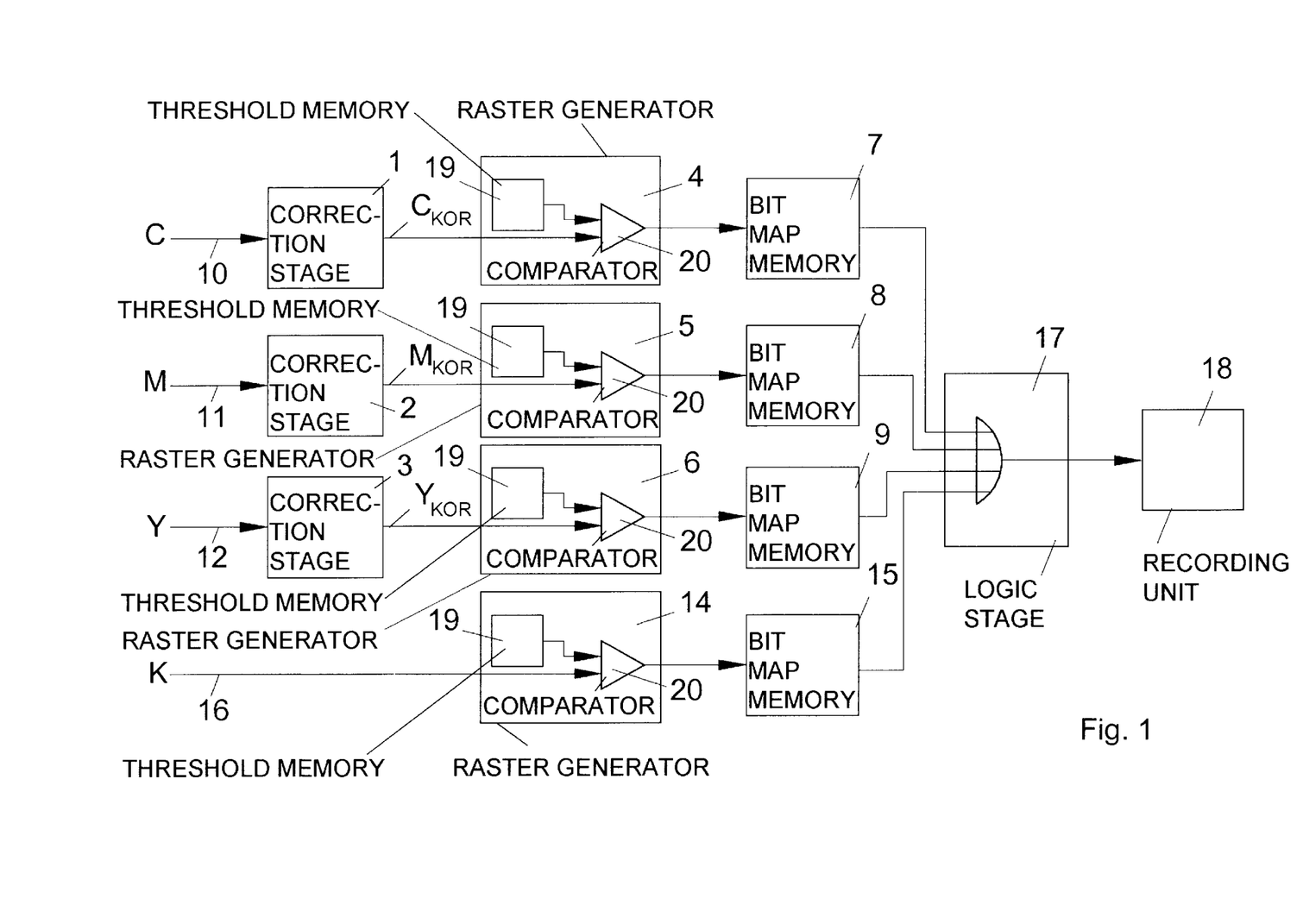
FIG. 1 is a first exemplary embodiment of an apparatus for producing a rastered gray composite proof in the form of a schematic block circuit diagram.

FIG. 1 shows a first exemplary embodiment of an apparatus for producing a rastered gray composite proof in the form of a schematic block circuit diagram. The apparatus is essentially composed of a respective correction stage 1,2,3 of a following raster generator 4,5,6 and of a following bit map memory 7,8,9 in each of the three color channels 10,11,12 for the chromatic color separations "cyan", "magenta" and "yellow", as well as of a further raster generator 14 with a following bit map memory 15 in the color channel 16 for the color separation "black", as well as of a logic stage 17 for the four color channels 10,11,12,16 and a black-and-white recording unit 18 following the logic stage 17 in the form of a black-and-white printer or black-and-white plotter for printing the rastered gray composite proof on a recording material, for example on a sheet of paper. The logic stage 17, for example, is a commercially obtainable personal computer PC. In the first exemplary embodiment, each raster generator 4,5,6,14 comprises an addressable threshold memory 19 and a comparator 20.

The color separation values C,M,Y of the three chromatic color separations "cyan" C, "magenta" M and "yellow" Y of the color image to be reproduced are first supplied to the correction stage 1,2,3 in the three color channels 10,11,12. The color separation values C,M,Y and the color separation values K for the color separation "black" (K) represent gray scale values, for example in a value range from 0 (white) to 63 (black).

In order to be able to record a gray composite proof with a correct brightness impression for the advance monitoring, the gray scale values of the three chromatic printing inks "cyan", "magenta" and "yellow" must be reduced to different percentage parts compared to the original gray scale values. For that purpose, the color separation values C,M,Y in the first exemplary embodiment are limited in the correction stages 1,2,3 in terms of their respective value ranges by multiplication by different correction factors $L_C$, $L_M$, $L_Y$ according to equations 1 in order to obtain corrected color separation values $C_{KOR}$, $M_{KOR}$, $Y_{KOR}$.

$$C_{KOR} = L_C \times C$$
$$M_{KOR} = L_M \times M \quad [1]$$
$$Y_{KOR} = L_Y \times Y$$

A relative brightening of the chromatic printing inks "cyan", "magenta" and "yellow" compared to "black" is achieved by the different limiting of the value ranges of the color separation values C,M,Y according to Equations 1, so that the gray scale values of the gray composite proof to be produced convey the brightness impression of the colors "cyan", "magenta" and "yellow" printed in the later color printing to the farthest reaching extent. As a result thereof, the gray composite proof advantageously enables a definitive advance monitoring of a color print.

For determining the correction factors for $L_C$, $L_M$, $L_Y$ the color separation values C,M,Y, the corresponding luminance values of rastered full tone surfaces (raster point size 100%) of the printing inks "cyan", "magenta", "yellow" and "black" are measured with a spectral photometer and the measured results are placed in relationship to the luminance value (100%) of the full tone surface of the printing ink "black". For example, the following correction factors ($L_C$, $L_M$, $L_Y$) thereby derive:

| For full tone "cyan" | $L_C$ = 0.30 (30%) |
| For full tone "magenta" | $L_M$ = 0.59 (59%) |
| For full tone "yellow" | $L_Y$ = 0.11 (11%) |

These correction factors ($L_C$,$L_M$,L) respectively correspond to the subjectively sensed brightness impression of the chromatic printing inks "cyan", "magenta" and "yellow" compared to "black".

With these correction factors ($L_C$,$L_M$,$L_Y$) in the example, a limited value range from 0 through 19 derives for the color separation values C, a limited value range from 0 to 36 derives for the color separation values M and a limited value range from 0 to 6 derives for the color separation values Y, whereas the value range for the color separation values K is unlimited between 0 and 63. Due to the limitation of the value range, brightnesses of only about 30%, 59% and 11% compared to the 100% brightness of "black" are respectively printed in the printing of the gray composite proof given the maximum original gray scale values of the chromatic printing inks.

The color separation values ($C_{KOR}$,$M_{KOR}$,$Y_{KOR}$) of the chromatic color separations differently limited in terms of their value ranges in the correction stages 1,2,3 and the color separations values K of the color separation "black" unlimited in terms of its value range are supplied to the raster generators 4,5,6,14 in the four color channels 10,11,12,16 in which they are converted according to predetermined, different raster functions for the four printing inks into control bits with the statuses "0" or "1" for the pixels to be recorded in the form of four individual bit maps for the printing inks "cyan", "magenta", "yellow" and "black". A bit map is a matrix-like arrangement of bits that are allocated to the individual pixels into which the recording material is divided according to the fineness of the recording. The control bits of the four individual bit maps generated in the raster generators 4,5,6,14 are intermediately stored in the following bit map memories 7,8,9,15.

The control bits of the four individual bit maps read out from the bit map memories 7,8,9,15 are then united pixel-by-pixel in the logic stage 17 by a logical OR operation to form the control bits of an overall bit map. The control bits of the overall bit map are supplied to the black-and-white printer as recording unit 18 for the pixel-by-pixel and line-by-line printing of the rastered gray composite proof, whereby each control bit, corresponding to its respective status "0" or "1", signals whether the pixel allocated to the corresponding control bit is printed on the recording material as raster point or part of a raster point, or is not printed.

The logical OR operation of the control bits of the four stored individual bit maps should simulate an addition of brightness values, at least for low brightness values. In order to achieve an addition of the brightness values, it is necessary that the printed pixels of the chromatic printing inks "cyan", "magenta" and "yellow" lie next to one another on the recording material, whereas the printed pixels of the printing ink "black" can also superimpose with the printed pixels of the chromatic printing inks. This demand is satisfied by a specific generation of the individual bit maps in the raster generators 4,5,6,14. The raster method and the functioning of the raster generators 4,5,6,14 shall be described in greater detail below.

A raster is composed of a plurality of raster meshes that adjoin one another and periodically repeat in the line direction and perpendicular thereto wherein, dependent on the gray scale values to be recorded, a differently great number of pixels are recorded arbitrarily distributed in the raster mesh or as compact raster points of different sizes. The recording material is to be imagined as being divided into a plurality of pixels. During the recording of the gray composite proof, the printing element of the black-and-white printer sweeps across the individual pixels, and the statuses "0" or "1" of the control bits of the overall bit map topically allocated to the pixels decide which pixels are printed (status "1") or are not printed (status "0").

The generation of the individual bit maps in the raster generators 4,5,6,14 for the four printing inks occurs, for example, according to U.S. Pat.No. 4,499,489.

A threshold matrix that is divided into matrix elements is stored in the addressable matrix memory 19 of a raster generator. Each matrix element has a threshold allocated to it. The thresholds represent the periodically repeating basic structure of each raster mesh of the raster. A pixel within the raster mesh of the raster corresponds to each matrix element within the threshold matrix. The thresholds of the individual matrix elements are respectively deposited under those addresses of the threshold memory 19 that correspond to the locus coordinates of the allocated pixels in the raster mesh of the raster. When generating the individual bit maps, that threshold whose position within the threshold memory 19 corresponds to the position of the corresponding pixel within the respective raster mesh is called for each pixel within a raster mesh by a corresponding addressing of the threshold memory 19. The threshold called in the threshold memory 19 are compared pixel-by-pixel in the comparators 20 to the corresponding color separation values, and the corresponding control bits with the statuses "0" or "1" are derived from the comparison. For example, "0" is set for color separation values ≧threshold and "1" is set for color separation values ≦threshold, whereby matrix elements of the threshold matrix not occupied with a threshold are occupied with "0" in the bit map.

Given the assumed value range from 0 to 63 for the original color separation values C,M,Y,K, each threshold matrix stored in the threshold memories 19 of the four raster generators 4,5,6,14 is composed of 8×8 matrix elements. In the first exemplary embodiment, wherein the value ranges of the color separation values C,M,Y of the chromatic printing inks were limited in the correction stages 1,2,3, relevant thresholds are distributed in the threshold matrix, whereby it is assured in the three threshold matrices of the chromatic printing inks "cyan", "magenta" and "yellow" that matrix elements that are occupied with a threshold in one of the three threshold matrices are not occupied with thresholds in the other two threshold matrices. As already explained above, this demand results therefrom that printed pixels of the three chromatic printing inks "cyan", "magenta" and "yellow" should lie side-by-side in order to achieve an addition of brightnesses.

The structure of the threshold matrices and of the individual bit maps of the three chromatic printing inks "cyan", "magenta" and "yellow" for the apparatus of FIG. 1 is explained with reference to graphic illustrations in FIGS. 2,3 and 4.

Figure 2A:
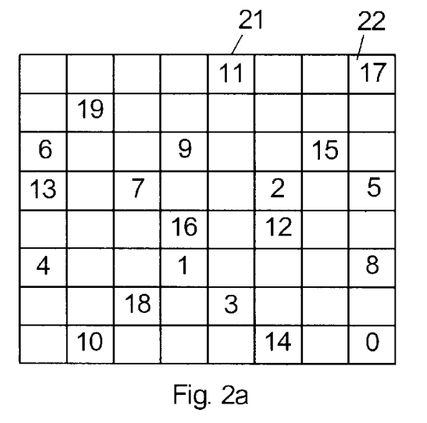
FIGS. 2a;2b are a first graphic illustration of a threshold matrix and of a bit map for the printing ink "cyan"
Figure 2B:
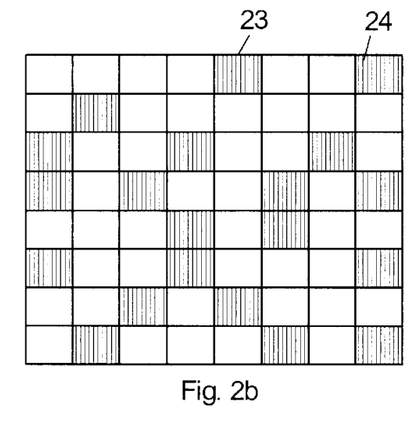

FIGS. 2a and 2b show the threshold matrix 21 and the corresponding individual bit map 23 of the printing ink "cyan" for the maximum color separation value C=63 100%. FIG. 2a shows the threshold matrix 21 with the 8×8 matrix elements 22. The relevant threshold from 1 through 19 corresponding to the limited value range for the color separation values "cyan" are allocated to arbitrarily selected matrix elements 22 in the threshold matrix 21, whereas the remaining matrix elements 22 are not occupied. FIG. 2b shows the bit map 23 of 8×8 memory locations 24 for a raster mesh of the raster composed of 8×8 pixels for the maximum color separation value C=63 (100%) that corresponds to the reduced color separation value $C_{KOR}$=19.2. In the present case, 20 memory locations (24) of the bit map are set with "1" for the reduced color separation value $C_{KOR}$=19.2, these being marked with a pattern. Correspondingly fewer memory locations 24 of the bit map 23 would be occupied with "1" for smaller reduced color separation values ($C_{KOR}$). For example, 10 memory locations 24 would be occupied for the reduced color separation value $C_{KOR}$=9.6 (50%), the matrix elements 22 occupied with the thresholds <10 in the threshold matrix 21 corresponding thereto.

Figure 3A:
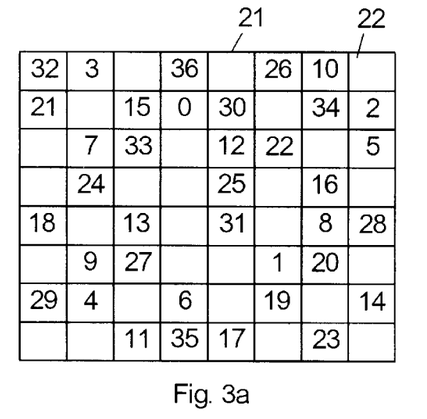
FIGS. 3a;3b are a first graphic illustration of a threshold matrix and of a bit map for the printing ink "magenta"
Figure 3B:
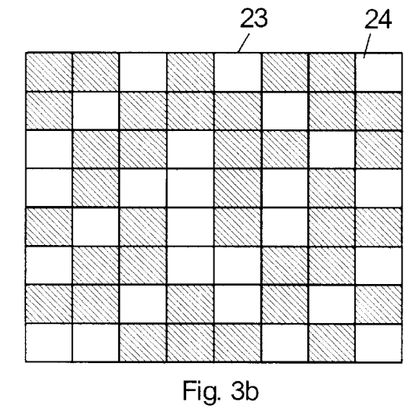

FIGS. 3a and 3b show the threshold matrix 21 and the corresponding individual bit map 23 of the printing ink "magenta" for the maximum color separation value M=63 (100%) that corresponds to the reduced color separation value $M_{KOR}$=37.8. The relevant thresholds from 0 to 36 are again entered in the threshold matrix 21 for "magenta". In the present case, 37 memory locations 24 of the bit map 23 are set with "1" for the reduced color separation value $M_{KOR}$=37.8. For smaller reduced color separation values ($M_{KOR}$), correspondingly fewer memory locations 24 of the bit map 23 would again be occupied with "1". For example, 19 memory locations 24 would be occupied for the reduced color separation value $M_{KOR}$=18.9 (50%), matrix elements 22 occupied with the thresholds <20 in the threshold matrix 21 corresponding thereto.

Figure 4A:
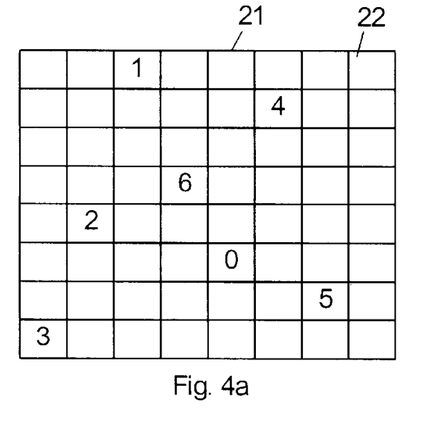
FIGS. 4a;4b are a first graphic illustration of a threshold matrix and of a bit map for the printing ink "yellow"
Figure 4B:
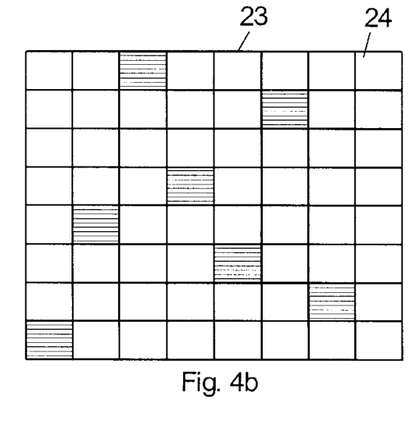

FIGS. 4a and 4b show the threshold matrix 21 and the corresponding individual bit map 23 of the printing ink "yellow" for the maximum color separation value Y=63 (100%) that corresponds to the reduced color separation value $Y_{KOR}$=7.04. The relevant thresholds from 0 to 6 are again entered in the threshold matrix 21 for "yellow". In the present case, 7 memory locations 24 of the bit map 23 are set with "1" for the reduced color separation value $Y_{KOR}$=7.04. For smaller reduced color separation values $Y_{KOR}$, correspondingly fewer memory locations 24 of the bit map 23 would again be occupied with "1". For example, 4 memory locations 24 would be occupied for the reduced color separation value $Y_{KOR}$=3.52 (50%), matrix elements 22 occupied with the thresholds <3 in the threshold matrix 21 corresponding thereto.

The comparison of the threshold matrices 21 of the three chromatic printing inks "cyan", "magenta" and "yellow" according to FIGS. 2a, 3a and 4a shows that matrix elements 22 that are occupied with a threshold in one of the three threshold matrices 21 are not occupied in the other two threshold matrices 21. As already explained before, this demand results therefrom that pixels of the three chromatic printing inks "cyan", "magenta" and "yellow" are printed juxtaposed in the gray composite proof.

The thresholds from 0 to 63 are distributed over the 8×8 matrix elements in the threshold matrix 21 of the printing ink "black". Given a color separation value K=63 (100%), all 8×8 memory locations in the individual bit map are set with "1", whereas only half the memory locations 24 would be occupied with "1" given a color separation value K=31.5

(50%). Since matrix elements 22 that are also occupied in the threshold matrices 21 of the chromatic printing inks are occupied in the threshold matrix 21 for the printing ink "black", pixels of the printing ink "black" in the gray composite proof are printed over pixels of the chromatic printing inks. The threshold distribution within the threshold matrix 21 for the printing ink "black" is expediently implemented such that, given a color separation value K=31.5 (50%) in a raster mesh, approximately half the printed pixels of the printing ink "black" fall on pixels of the chromatic printing inks that have already been printed, and the other half fall on pixels of the raster mesh that are still "free". In this way, a brightness value of about 75% that is subjectively sensed as correct is reproduced in the gray composite proof, this also corresponding to the brightness impression in conventional four-color printing.

Figure 5:
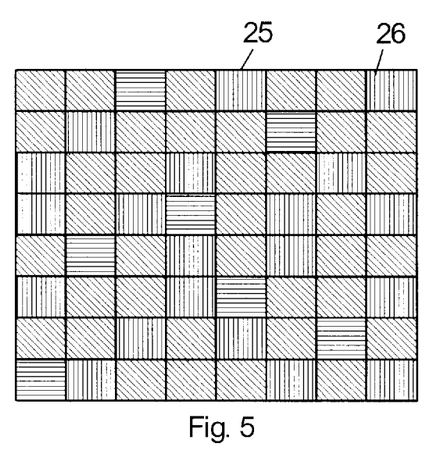
FIG. 5 is a graphic illustration of an overall bit map or, of a raster mesh.

FIG. 5 shows the overall bit map 25 with 8×8=64 memory locations 26 or, a raster mesh of 8×8=64 pixels of the raster in the gray composite proof for the color separation values C=M=Y=63 (100%) generated by the OR operation of the individual bit maps 23 in the logic stage 17 without taking the printing ink "black" into consideration. It can be seen that, of the 64 pixels of the raster mesh and corresponding to the above-explained correction factors $L_C$ =0.30, $L_M$=0.59 and $L_Y$=0.11, approximately 30% of the pixels are printed for the printing ink "cyan" in the raster mesh, approximately 59% of the pixels are printed for the printing ink "magenta" and approximately 11% of the pixels are printed for the printing ink "yellow", whereby the pixels allocated to the individual chromatic printing inks lie next to one another. Overall, this raster mesh reproduces a brightness impression of 100% that is composed of the percentage brightness parts of the chromatic printing inks.

Figure 6:
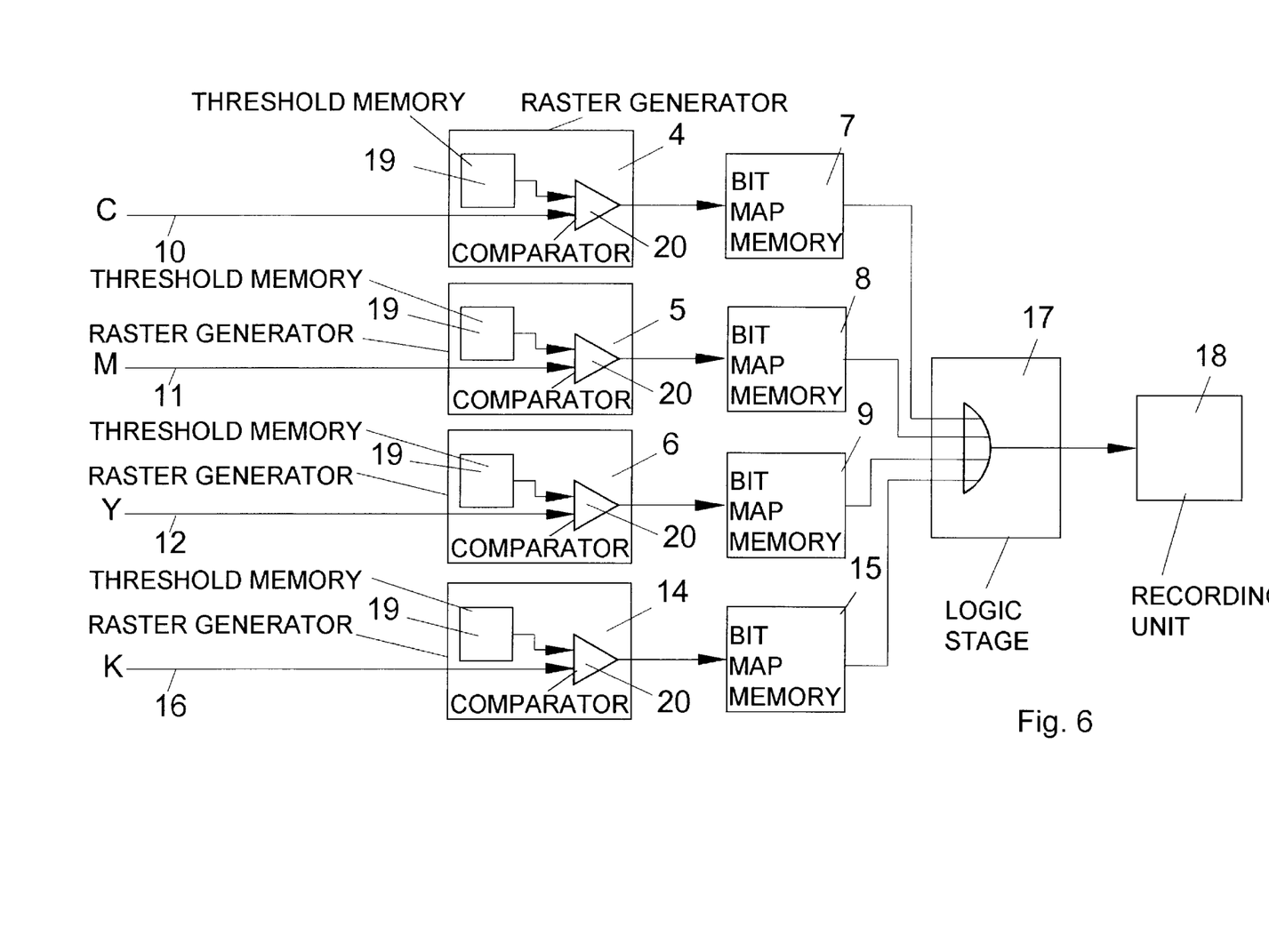
FIG. 6 is a second exemplary embodiment of an apparatus for producing a rastered gray composite proof in the form of a schematic block circuit diagram.

FIG. 6 shows a second exemplary embodiment of an apparatus for producing a rastered gray composite proof in the form of a schematic block circuit diagram. The second exemplary embodiment differs from the first exemplary embodiment in that the correction stages 1,2,3 in the three color channels (10,11,12) are omitted. As a result thereof, the raster generators 4,5,6 in the three color channels 10,11, 12, just like the raster generator 14 in the color channel 16, are supplied with the uncorrected color separation values C,M,Y,K having the value range from 0 to 63 and these are converted into corresponding, individual bit maps for the printing inks "cyan", "magenta", "yellow" and "black".

In order to be able to record a gray composite proof with a correct brightness impression for the advance monitoring, the gray scale values to be recorded for the three chromatic printing inks "cyan", "magenta" and "yellow" compared to the original gray scale values must again be reduced to different percentage parts corresponding to the correction factors $L_C, L_M, L_Y$ according to Equations 1. Whereas a limitation of the value ranges of the color separation values C,M,Y of the chromatic colors is implemented in the correction stages 1,2,3 for this purpose in the first exemplary embodiment, the threshold matrices 21 for the chromatic printing inks in the threshold memories 19 of the raster generators 4,5,6 are modified in the second exemplary embodiment compared to the threshold matrices of the first exemplary embodiment. The modification is comprised therein that the three threshold matrices 21 of the chromatic printing inks are respectively occupied with a different plurality of thresholds from the full threshold range from 0 to 63, whereby the correction factors $L_C$=0.30, $L_M$=0.59 and $L_Y$=0.11 respectively reflect the plurality of matrix elements (22) occupied with thresholds with reference to the total plurality of the existing 8×8=63 matrix elements 2.

The structure of the threshold matrices 21 and of the individual bit maps 23 of the three chromatic printing inks "cyan", "magenta" and "yellow" for the apparatus according to FIG. 6 is explained with reference to graphic illustrations in FIGS. 7,8 and 9.

Figure 7A:
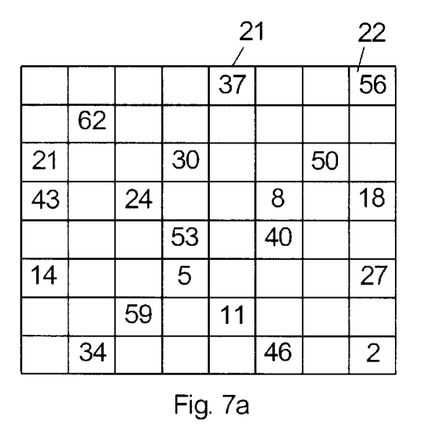
FIGS. 7a;7b are a second graphic illustration of a threshold matrix and of a bit map for the printing ink "cyan"
Figure 7B:
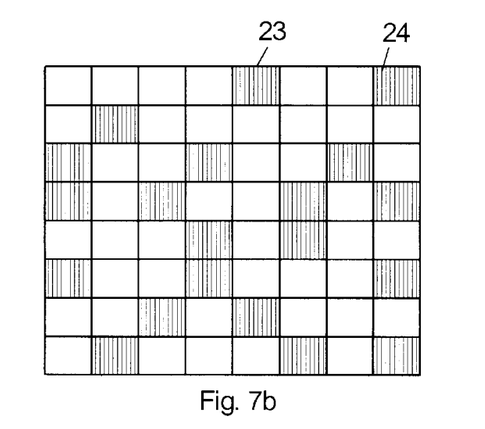

FIGS. 7*a* and 7*b* show the threshold matrix 21 and the corresponding individual bit map 23 of the printing ink "cyan" for the maximum color separation value C=63 100%. The threshold matrix 21 with the 8×8 matrix elements 22 is shown in FIG. 7*a*. Approximately 30% of the matrix elements 22 in the threshold matrix (21), namely 20 of the 64 matrix elements 21 are occupied with nearly equidistant 20 thresholds of the threshold range between 0 and 63. FIG. 7*b* shows the corresponding individual bit map (23) of 8×8 memory locations (24) for a raster mesh of the raster that is composed of 8×8 pixels. 20 memory locations 24 are occupied with "1" in the individual bit map 23 for the maximum color separation value C=63 100%, whereas only 10 memory locations would be occupied for a color separation value C=31.5 (50%).

Figure 8A:
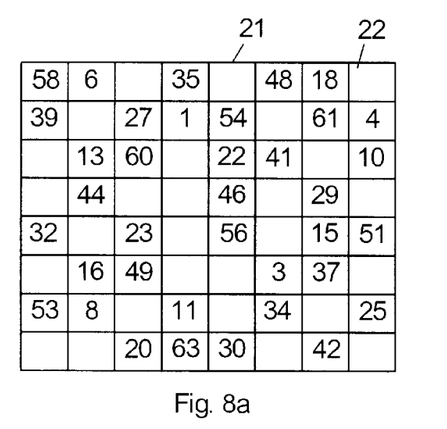
FIGS. 8a;8b are a graphic illustration of a threshold matrix and of a bit map for the printing ink "magenta"
Figure 8B:
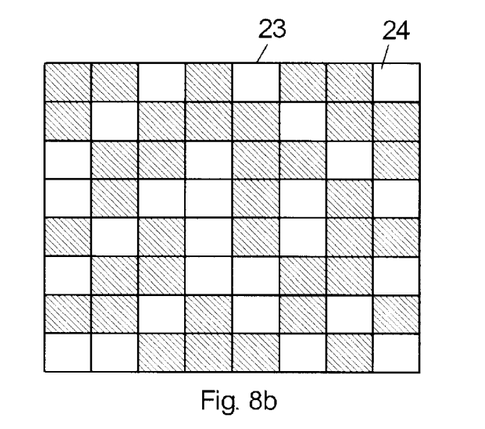

FIGS. 8*a* and 8*b* show the threshold matrix 21 and the corresponding individual bit map 23 of the printing ink "magenta" for the maximum color separation value M=63 100%. Approximately 59% of the matrix elements 22 in the threshold matrix 21, namely 37 of the 64 matrix elements 21 are occupied with nearly equidistant 37 thresholds of the threshold range between 0 and 63. FIG. 8*b* shows the corresponding individual bit map 23 for the maximum color separation value M=63 0 (100%) in which 37 memory locations 24 are occupied with "1", whereas only 19 memory locations would be occupied for a color separation value M=31.5 (50%).

Figure 9A:
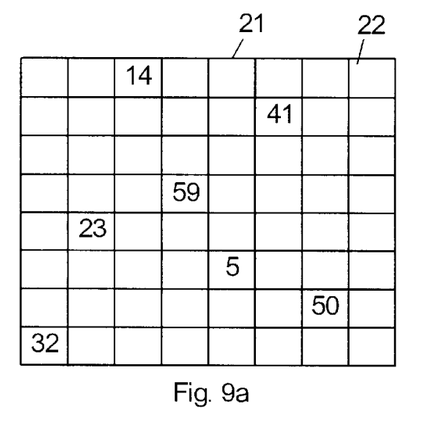
FIGS. 9a;9b are a second graphic illustration of a threshold matrix and of a bit map for the printing ink "yellow"
Figure 9B:
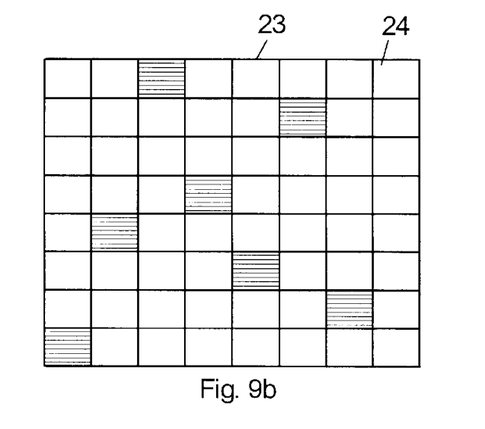
Figure 10:
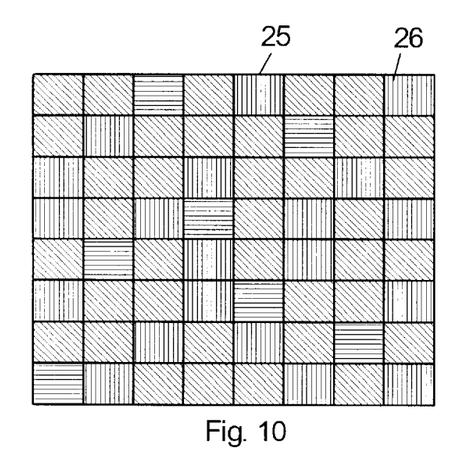
FIG. 10 is a further graphic illustration of an overall bit map or, a raster mesh.

FIGS. 9*a* and 9*b* show the threshold matrix 21 and the corresponding individual bit map 23 of the printing ink "yellow" for the maximum color separation value Y=63 100%. Approximately 11% of the matrix elements 22 in the threshold matrix 21, namely 7 of the 64 matrix elements 21 are occupied with 7 nearly equidistant thresholds of the threshold range between 0 and 63. FIG. 9*b* shows the corresponding individual bit map 23 for the maximum color separation value Y=63 (100%) in which 7 memory locations 24 are occupied with "1", whereas only 3 memory locations would be occupied for a color separation value Y=31.5 (50%).

FIG. 10 again shows the overall bit map 25 with 8×8=64 memory locations 26 or, a raster mesh of 8×8=64 pixels of the raster in the gray composite proof for the color separation values C=M=Y=63 (100%) generated by the OR operation of the individual bit maps 21 in the logic stage 17 without taking the printing ink "black" into consideration.

Figure 11:
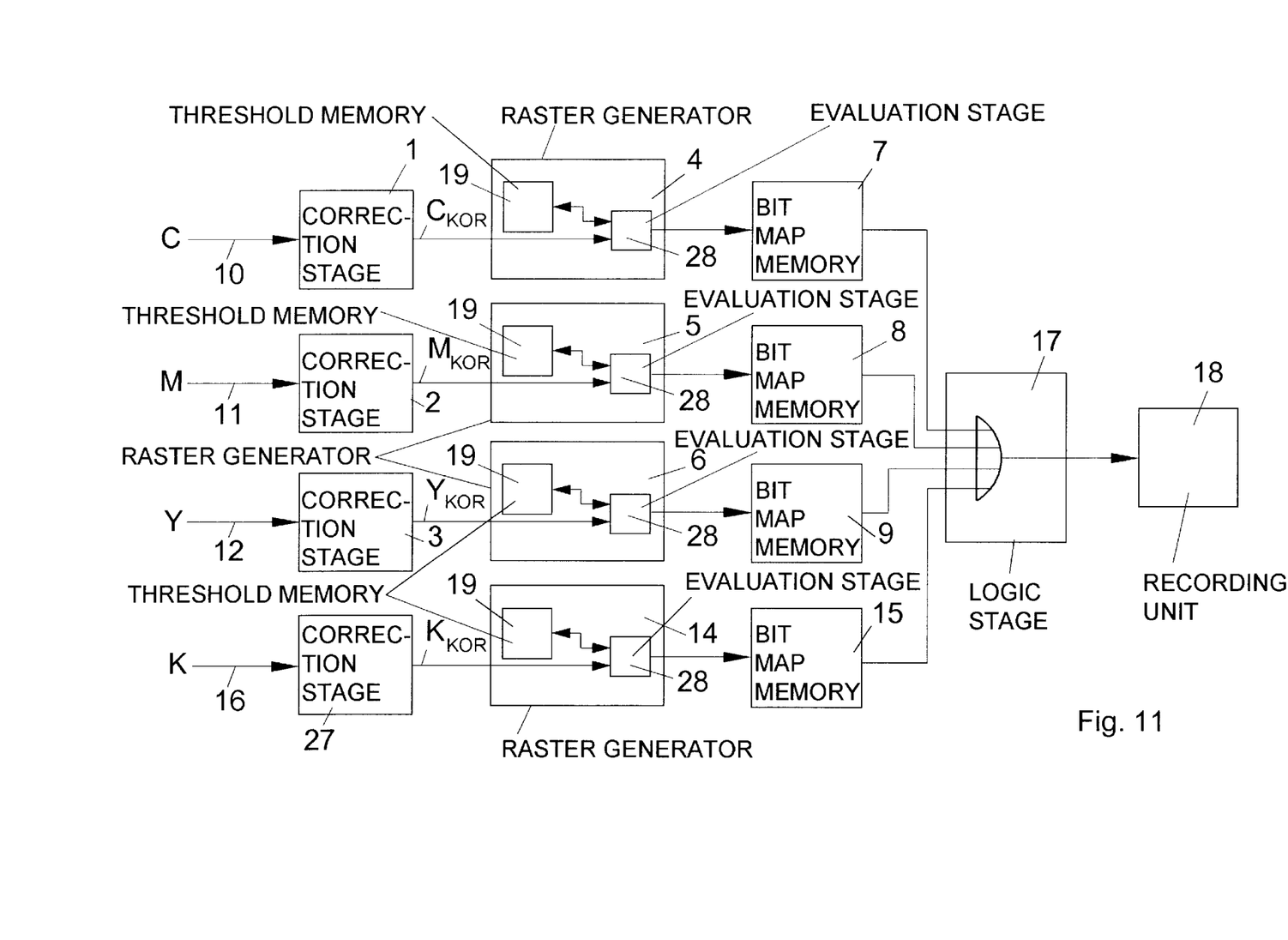
FIG. 11 is a third exemplary embodiment of an apparatus for producing a rastered gray composite proof in the form of a schematic block circuit diagram.

FIG. 11 shows a third exemplary embodiment of an apparatus for producing a rastered gray composite proof in the form of a schematic circuit diagram. The third exemplary embodiment differs from the apparatus of FIG. 1 on the basis of modified raster generators 4,5,6,14 and on the basis of an additional correction stage 27 in the color channel 16 for the color separation values (K). The raster generators 4,5,6,14 of the apparatus according to FIG. 1 contain threshold memories 19 and comparators 20, and the individual bit maps are generated by comparing the thresholds deposited in the threshold memories 19 to the color separation values in the comparators 20. The modified raster generators 4,5,6,14 of the apparatus of FIG. 11 contain threshold memories 19 with modified threshold matrices 21 and contain evaluation stages 28 instead of the comparators 20 for generating the individual bit maps. The modified threshold matrices 21 of the chromatic printing inks are graphically shown in FIGS.

12a,13a and 14a. The modified threshold matrices 21 each respectively comprise a distribution of relevant thresholds from the threshold range of 0 to 63 that corresponds to the threshold distribution shown in FIGS. 7a, 8a and 9a; however, the matrix elements in the modified threshold matrices 21 that are not occupied with relevant thresholds are occupied with thresholds lying outside the threshold range, for example with the threshold 64. For generating an individual bit map, the evaluation stage 28 checks the thresholds in the threshold memory 19 for every color separation value C or, respectively, M,Y,K=n, selects the lowest n thresholds, including the locus coordinates of the matrix elements 22 in the threshold matrix 21, and the memory locations 24 of the individual bit map 23 that correspond to the locus coordinates of the selected thresholds to "1".

Figure 12A:
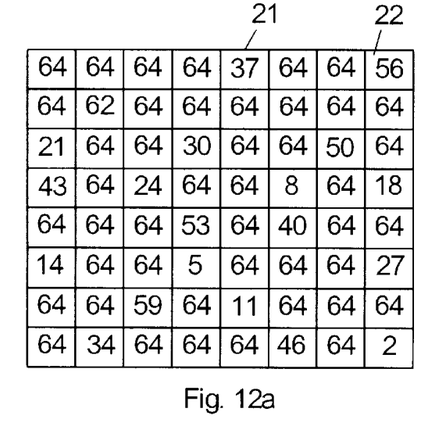
FIGS. 12a;12b are a third graphic illustration of a threshold matrix and of a bit map for the printing ink "cyan"
Figure 12B:
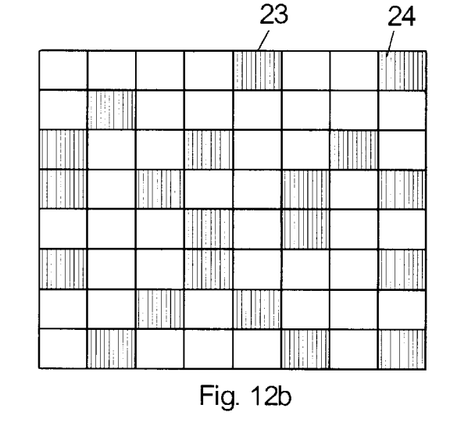
Figure 13A:
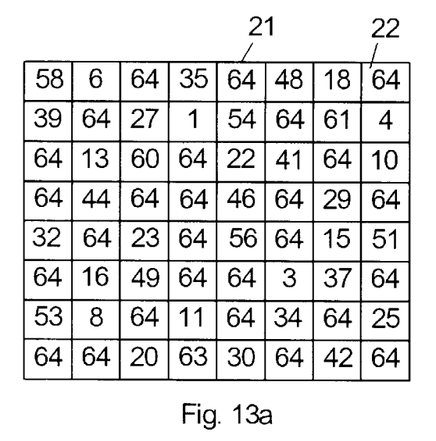
FIGS. 13a;13b are a third graphic illustration of a threshold matrix and of a bit map for the printing ink "magenta"
Figure 13B:
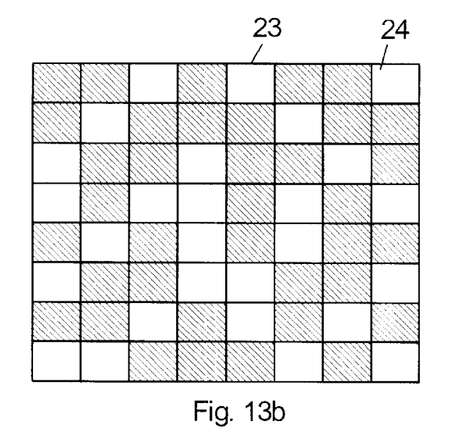
Figure 14A:
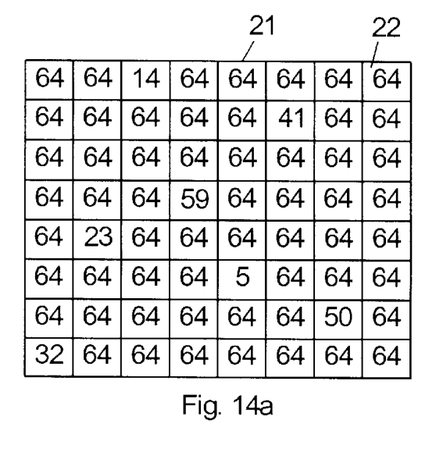
FIGS. 14a;14b are a third graphic illustration of a threshold matrix and of a bit map for the printing ink "yellow"
Figure 14B:
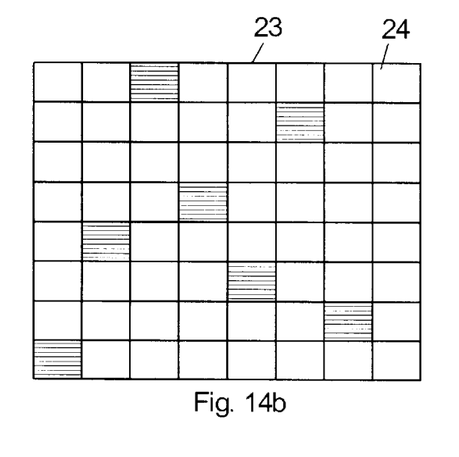

The structure of the modified threshold matrices 21 and of the individual bit maps 23 of the three chromatic printing inks "cyan", "magenta" and "yellow" for the apparatus of FIG. 11 is explained on the basis of graphic illustrations in FIGS. 12,13 and 14.

FIGS. 12a and 12b show the threshold matrix 21 and the corresponding individual bit map 23 of the printing ink "cyan" for the maximum color separation value C=63 100%. FIG. 7a shows the threshold matrix 21 with the 8×8 matrix elements 22. In the threshold matrix 21, approximately 30% of the matrix elements 22, namely 20 of the matrix elements 21, are occupied with nearly equidistant 20 relevant thresholds of the threshold range between 0 and 63, whereas the matrix elements 22 not occupied with relevant thresholds are filled with the threshold 64. FIG. 12b shows the corresponding, individual bit map 23 of 8×8 memory locations 24 for a raster mesh of the raster composed of 8×8 pixels. 20 Memory locations 24 are occupied with "1" in the individual bit map 23 for the maximum color separation value C=63 100%.

FIGS. 13a and 13b show the threshold matrix 21 and the corresponding individual bit map 23 of the printing ink "magenta" for the maximum color separation value M=63 100%. In the threshold matrix 21, approximately 59% of the matrix elements 22, namely 37 of the matrix elements 21, are occupied with nearly equidistant 37 relevant thresholds of the threshold range between 0 and 63, whereas the remaining matrix elements 22 are again filled with the threshold 64. FIG. 13b shows the corresponding, individual bit map 23 for the maximum color separation value M=63 100% in which 37 memory locations 24 are occupied with "1".

FIGS. 13a and 13b show the threshold matrix 21 and the corresponding individual bit map 23 of the printing ink "magenta" for the maximum color separation value M=63 (100%). In the threshold matrix 21, approximately 59% of the matrix elements 22, namely 37 of the matrix elements 21, are occupied with nearly equidistant 37 relevant thresholds of the threshold range between 0 and 63, whereas the remaining matrix elements 22 are again filled with the threshold 64. FIG. 13b shows the corresponding, individual bit map 23 for the maximum color separation value M=63 (100%) in which 37 memory locations 24 are occupied with "1".

FIGS. 14a and 14b show the threshold matrix 21 and the corresponding individual bit map 23 of the printing ink "yellow" for the maximum color separation value Y=63 (100%). In the threshold matrix 21 of FIG. 14a, approximately 11% of the matrix elements 22, namely 7 of the matrix elements 21, are occupied with 7 nearly equidistant relevant thresholds of the threshold range between 0 and 63, whereas the remaining matrix elements 22 are again filled with the threshold 64. FIG. 14b shows the corresponding, individual bit map 23 for the maximum color separation value Y=63 (100%) in which 7 memory locations 24 are occupied with "1".

A comparison of FIGS. 2b, 3b, 4b to FIGS. 7b, 8b, 9b or 14a, 14b and 14c shows that the individual bit maps 23 and, thus, the overall bit map as well or respectively, the printing result generated with the apparatus of FIG. 1, FIG. 6 and FIG. 11 are identical.

In the individual bit maps 23 of FIGS. 2b, 3b, 4b, 7b, 8b, 9b, 14a, 14b and 14c, the control bits are distributed over the entire area of the bit map. Accordingly, the printed pixels also lie distributed over a raster mesh of the raster on the gray composite proof, this corresponding to a frequency-modulated rastering.

Compact raster points composed of a plurality of printed pixels lying next to one another can also be generated by dividing the threshold matrices 21 into regions that do not overlap and are representative of the three chromatic printing inks and by a corresponding filling of the individual regions with thresholds.

The structure of the threshold matrices 21 and of the individual bit maps 23 of the three chromatic printing inks "cyan", "magenta" and "yellow" for generating compact raster points is explained with reference to graphic illustrations in FIGS. 15, 16 and 17.

Figure 15A:
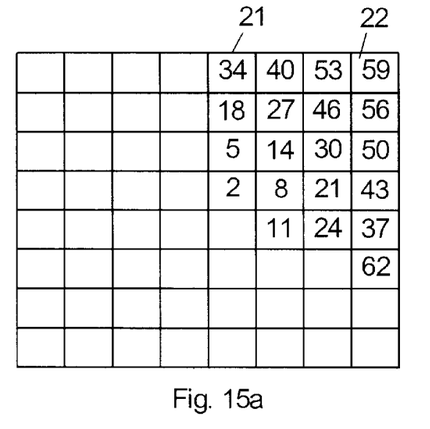
FIGS. 15a;15b are a fourth graphic illustration of a threshold matrix and of a bit map for the printing ink "cyan" for generating a compact raster point.
Figure 15B:
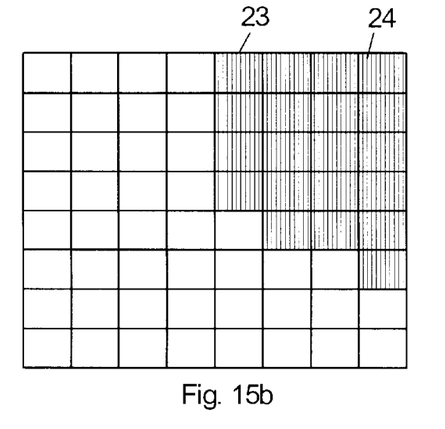

FIGS. 15a and 15b show the threshold matrix 21 and the corresponding individual bit map 23 of the printing ink "cyan" for the maximum color separation value C=63 100%. FIG. 15a shows the threshold matrix 21 with the 8×8 matrix elements 22. In the threshold matrix 21, approximately 30% of the matrix elements 22 within a limited, first matrix region, namely 20 of the 64 matrix elements 21 are occupied with nearly equidistant 20 thresholds of the threshold range between 0 and 63. FIG. 15b shows the corresponding individual bit map 23 of 8×8 memory locations 24 for a raster mesh of the raster composed of 8×8 pixels. In the individual bit map 23, 20 memory locations 24 are occupied with "1" for the maximum color separation value C=63 (100%) within a first memory area that positionally corresponds to the first matrix region.

Figure 16A:
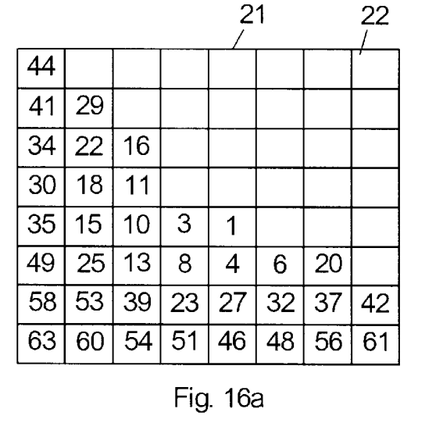
FIGS. 16a;16b are a fourth graphic illustration of a threshold matrix and of a bit map for the printing ink "magenta for generating a compact raster point.
Figure 16B:
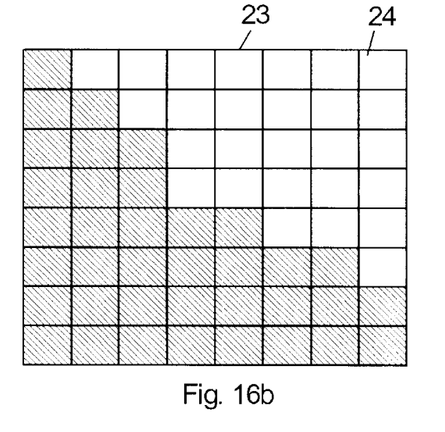

FIGS. 16a and 16b show the threshold matrix 21 and the corresponding individual bit map 23 of the printing ink "magenta" for the maximum color separation value M=63 100%. In the threshold matrix 21 of FIG. 16a, approxmately 59% of the matrix elements 22 within a limited, second matrix region that differs positionally from the first matrix region, namely 37 of the 64 matrix elements 21 are occupied with nearly equidistant 37thresholds of the threshold range between 0 and 63. FIG. 16b shows the corresponding individual bit map 23 for the maximum color separation value M=63 (100%) in which 37 memory locations (24) are occupied with "1" within a second memory area that positionally corresponds to the second matrix region.

Figure 17A:
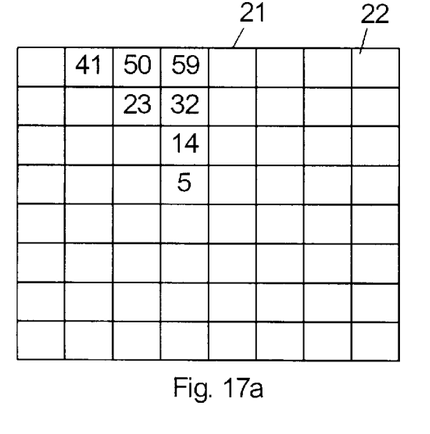
FIGS. 17a;17b are a fourth graphic illustration of a threshold matrix and of a bit map for the printing ink "yellow" for generating a compact raster point.
Figure 17B:
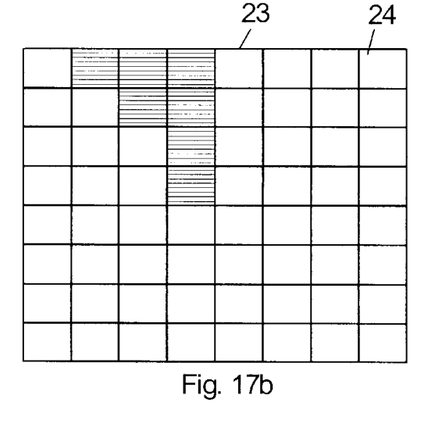
Figure 18:
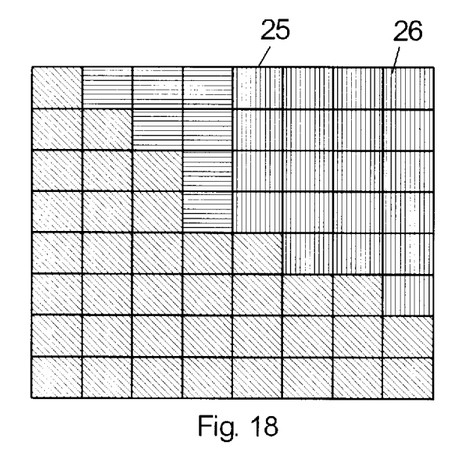
FIG. 18 is a further graphic illustration of an overall bit map or, of a raster mesh for generating a compact raster point.

FIGS. 17a and 17b show the threshold matrix 21 and the corresponding individual bit map 23 of the printing ink "yellow" for the maximum color separation value Y=63 (100%). In the threshold matrix (21) of FIG. 17a, approxmately 11% of the matrix elements 22 within a limited, third matrix region that again differs positionally from the first and second matrix region, namely 7 of the 64 matrix elements 21 are occupied with 7 nearly equidistant thresholds of the threshold range between 0 and 63. FIG. 17b shows the corresponding individual bit map 23 for the maximum color separation value Y=63 100% in which 7 memory locations 24 are occupied with "1" within a third memory area that positionally corresponds to the third matrix region.

FIG. 18 again shows the overall bit map 25 with 8×8=64 memory locations 26 or, respectively, a raster mesh of 8×8=64 pixels of the raster in the gray composite proof for the color separation values C=M=Y=63 (100%) generated by the OR operation of the individual bit maps 21 in the logic stage 17 without taking the printing ink "black" into consideration. 64 juxtaposed pixels are printed in the raster mesh, 20 of these being allocated to the printing ink "cyan", 53 pixels being allocated to the printing ink "magenta" and 7 pixels being allocated to the printing ink "yellow". The raster point is thus composed of three sub-areas for the printing inks "cyan", "magenta" and "yellow", whereby the percentage parts of the sub-areas in the overall areas of the raster mesh correspond to the correction factors ($L_C$, $L_M$, $L_Y$).

The apparatus described in FIGS. 1, 6 and 7 for generating a rastered gray composite proof each respectively comprise four color channels in which the color separation values C,M,Y,K are processed parallel, and the generated individual bit maps are simultaneously intermediately stored in the bit map memories 7,8,9,15. For simplification, of course, the apparatus can also be implemented single-channel with one raster generator and, potentially, a preceding correction unit. In this case, the color separation values C,M,Y,K are serially processed, whereby the corresponding correction factors $L_C$, $L_M$, $L_Y$ are respectively successively loaded into the correction unit and the threshold matrices of the individual printing inks are successively loaded into the threshold memory of the raster generator.

Figure 19:
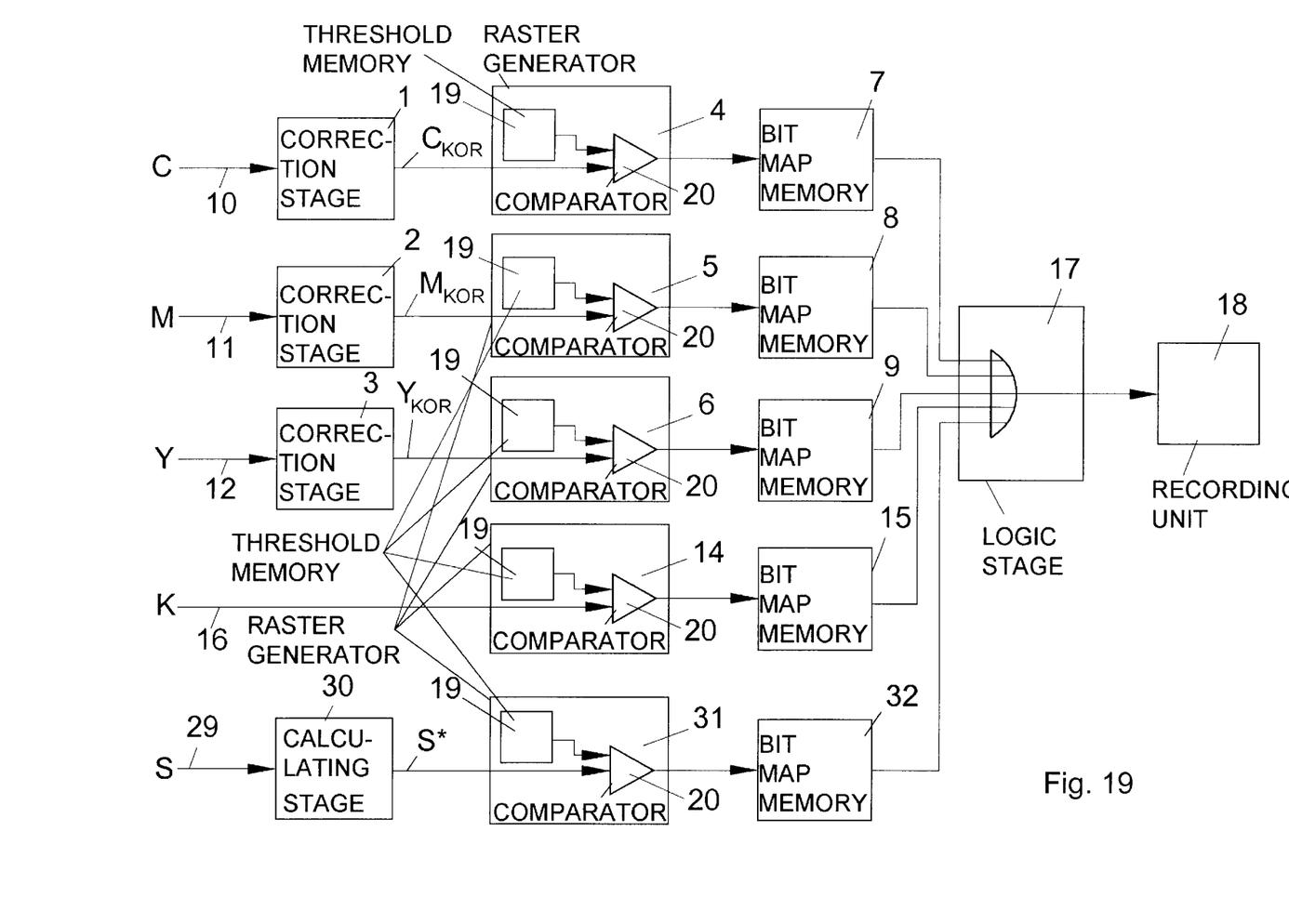
FIG. 19 is an advantageous development of the devices for taking decorative colors into consideration in the gray composite proof.

FIG. 19 shows an advantageous development of the apparatus of FIG. 1 wherein decorative colors are additionally taken into consideration in the gray composite proof. For additional processing of the color separation values (S) of a decorative color (special color), the apparatus of FIG. 1 is expanded by a fifth color channel 29 that contains a calculating stage 30 and a further raster generator 31 with a following bit map memory 32. A decorative color is a color that does not arise by superimposed printing of the chromatic printing inks "cyan", "magenta" and "yellow", but is mixed by itself and is additionally printed with a separate printing form. For example, a "gold tone" is such a decorative color.

In the calculating stage 30, the color separation values (S) of the decorative color are first converted into modified color separation values S*. The individual bit map for the decorative color is generated from the modified color separation values S* in the raster generator 31 and is intermediately stored in the bit map memory 32. The raster generator 31 contains the same threshold matrix as the raster generator 14 for the printing ink "black". The individual bit map of the decorative color together with the four other bit maps of the printing inks "cyan", "magenta", "yellow" and "black" are then united by the OR operation in the logic stage 17 to form the overall bit map. A decorative color normally lies at an image location in a color image to be reproduced that differs from the colors that are reproduced by the chromatic printing inks. For this reason, a pixel does not simultaneously comprise the color separation values (S) of a decorative color and the color separation values YMC of the chromatic printing inks, so that a true OR operation occurs in the logic stage (17), as a result of which the pixels of the decorative color are likewise printed next to the pixels of the chromatic printing inks in the gray composite proof.

In the calculating stage (30), the color separation values (S) of a decorative color are first converted into corresponding color separation values ($C_S$,$M_S$,$Y_S$,$K_S$) of the printing inks "cyan", "magenta", "yellow" and "black". This conversion, for example, occurs on the basis of a stored color table from which those color separation values ($C_S$, $M_S$,$Y_S$,$K_S$) of the printing inks "cyan", "magenta", "yellow" and "black" that approximately reproduce the special color are taken for a decorative color. The color separation values ($C_S$,$M_S$,$Y_S$) of the chromatic printing inks "cyan", "magenta", "yellow" are reduced in value by multiplication with the correction factors ($L_C$, $L_M$, $L_Y$). An equivalent gray scale value $G_S$=$C_S$+$M_S$+$Y_S$ is formed by addition of the reduced color separation values ($C_S$,$M_S$,$Y_S$). The equivalent gray scale value $G_S$ is then multiplied by the color separation value ($K_S$) for the printing ink "black" in order to obtain the product $G_S$×$K_S$. For forming the modified color separation value (S*) of the decorative color, finally, the equivalent gray scale value $G_S$, the color separation value ($K_S$) for the printing ink "black" and the product $G_S$×$K_S$ are added. According thereto, the modified color separation values (S*) derive according to Equation [2] as:

$$S^* = (C_S + M_S + Y_S + K_S) + K_S \times (C_S + M_S + Y_S) \qquad [2]$$

Of course, the expansion for the additional processing of decorative colors can also be employed given the apparatus of FIG. 6 and FIG. 11.

It lies within the framework of the invention to employ PostScript-coded color values instead of color separation values. In this case, the PostScript-coded color values are first decoded in a PostScript interpreter and the decoded color values are then serially further-processed.

Although various minor changes and modifications might be proposed by those skilled in the art, it will be understood that our wish is to include within the claims of the patent warranted hereon all such changes and modifications as reasonably come within our contribution to the art.

We claim as our invention:

1. A method for producing a rastered gray composite proof for advance monitoring of color printing of a color image, comprising the steps of:

generating color separation values of color separations "cyan", "magenta", "yellow" and "black" of said color image;

dividing a recording material into pixels;

correcting gray scale values to be recorded on the gray composite proof to different percentage parts for the color printing compared to gray scale values of chromatic printing inks "cyan", "magenta" and "yellow" represented by the color separation values, said different percentage parts respectively corresponding to a subjectively sensed brightness impression of the chromatic printing inks "cyan", "magenta" and "yellow" with reference to printing ink "black";

converting the color separation values of the chromatic printing inks "cyan", "magenta" and "yellow" according to different raster functions into control bits in the form of three individual bit maps allocated to the pixels such that the recorded pixels of the chromatic printing inks "cyan", "magenta" and "yellow" lie next to one another on the recording material;

uniting the individual bit maps of the chromatic printing inks "cyan", "magenta" and "yellow" to form an overall bit map; and driving a black-and-white recording device with the control bits of the overall bit map for recording the gray composite proof pixel-by-pixel and line-by-line on the recording material, the color values of the chromatic printing inks "cyan", "magenta", "yellow" being united to brightness-equivalent gray scale values, and the control bits of the bit map determining during the recording whether the pixels are or are not recorded as raster points or parts of a raster point.

2. The method according to claim 1 wherein the color separation values of the color separation "black" are converted according to a raster function into a further individual bit map; and the individual bit map of the printing ink "black" is united with the individual bit maps of the chromatic printing inks "cyan", "magenta" and "yellow" to form the overall bit map.

3. The method according to claim 1 wherein the unification of the individual bit maps to form the overall bit map occurs by a logical OR operation of the control bits.

4. The method according to claim 1 wherein the control bits of the individual bit maps of the printing inks are respectively generated by comparison of the color separation values of the corresponding printing inks to thresholds of a respective threshold matrix that represents a raster function.

5. The method according to claim 1 wherein the individual bit maps of the printing inks are respectively generated by a selection of thresholds of a threshold matrix representing a raster function, said selection being dependent on the color separation values of the corresponding printing inks, and by conversion of the selected thresholds into the control bits.

6. The method according to claim 4 wherein:

the threshold matrices are divided into matrix elements that can be occupied with thresholds; and matrix elements that are occupied in one of the three threshold matrices of the chromatic printing inks "cyan", "magenta" and "yellow" are not occupied with thresholds in the other two threshold matrices.

7. The method according to claim 1 wherein:

the correction of the gray scale values to be recorded in the gray composite proof compared to the gray scale values of the chromatic printing inks "cyan", "magenta" and "yellow" represented by the color separation values is implemented by different percentage limitations of the value ranges of the color separation values of the chromatic printing inks "cyan", "magenta" and "yellow", the percentage limitations respectively corresponding to the subjectively sensed brightness impression of the chromatic printing inks "cyan" and "magenta"; and the corrected color separation values are converted via the raster functions into the individual bit maps of the chromatic printing inks "cyan" and "magenta".

8. The method according to claim 4 wherein:

the correction of the gray scale values to be recorded in the gray composite proof compared to the gray scale values of the chromatic printing inks "cyan", "magenta" and "yellow" represented by the color separation values is implemented by a different number of thresholds within the threshold matrices of the chromatic printing inks "cyan", "magenta" and "yellow", the respective, different plurality of thresholds being determined according to subjectively sensed brightness impressions of the chromatic printing inks "cyan", "magenta" and "yellow" with reference to the printing ink "black"; and uncorrected color separation values are converted via the raster functions into the individual bit maps of the chromatic printing inks "cyan", "magenta" and "yellow".

9. The method according to claim 7 wherein the different limitation of the value ranges of the color separation values of the chromatic printing inks "cyan", "magenta" and "yellow" is implemented by multiplication of the color separation values with correction factors that correspond to the subjectively sensed brightness impressions of the chromatic printing inks "cyan", "magenta" and "yellow" with reference to the printing ink "black".

10. The method according to claim 1 wherein:

luminance values of rastered full tone surfaces of the printing inks "cyan", "magenta", "yellow" and "black" are measured; and correction factors correspond to the measured luminance values of rastered full tone surfaces of the printing inks "cyan", "magenta", "yellow" and "black" referred to the luminance value 100% of the rastered full tone surface of the printing ink "black".

11. The method according to claim 4 wherein:

the correction of the gray scale values to be recorded in the gray composite proof compared to the gray scale values of the chromatic printing inks "cyan", "magenta" and "yellow" represented by the color separation values is implemented by different percentage limitations of value ranges of the color separation values of the chromatic printing inks "cyan", "magenta" and "yellow", the percentage limitations respectively corresponding to the subjectively sensed brightness impression of the chromatic printing inks "cyan", "magenta" and "yellow" with reference to the printing ink "black";

matrix elements of the threshold matrices of the chromatic printing inks "cyan", "magenta" and "yellow" are respectively occupied with thresholds of a limited threshold range that corresponds to a limited value range of corresponding corrected color separation values; and the corrected color separation values are compared to the thresholds of the threshold matrices in order to obtain the control bits of the individual bit maps.

12. The method according to claim 4 wherein:

the correction of the gray scale values to be recorded in the gray composite proof compared to the gray scale values of the chromatic printing inks "cyan", "magenta" and "yellow" represented by the color separation values is implemented by a different number of relevant thresholds within the threshold matrices of the chromatic printing inks "cyan", "magenta" and "yellow" selected from the threshold range, the respective, different plurality of thresholds being determined according to the subjectively sensed brightness impression of the chromatic printing inks "cyan", "magenta" and "yellow" with reference to the printing ink "black"; and uncorrected color separation values are compared to the thresholds of the threshold matrices in order to obtain the control bits of the individual bit maps.

13. The method according to claim 12 wherein the relevant thresholds are selected equidistantly from the threshold range.

14. The method according to claim 4 wherein:

the correction of the gray scale values to be recorded in the gray composite proof compared to the gray scale values of the chromatic printing inks "cyan", "magenta" and "yellow" represented by the color separation values is implemented by different percentage limitations of value ranges of the color separation values of the chromatic printing inks "cyan", "magenta" and "yellow", the percentage limitations respectively corresponding to the subjectively sensed brightness impressions of the chromatic printing inks "cyan", "magenta" and "yellow" with reference to the printing ink "black";

matrix elements in the threshold matrices of the chromatic printing inks "cyan", "magenta" and "yellow" are respectively occupied with a different number of relevant thresholds selected from a threshold range, the respective, different number of thresholds being determined according to the subjectively sensed brightness impressions of the chromatic printing inks "cyan", "magenta" and "yellow" with reference to the printing ink "black";

matrix elements not occupied with relevant thresholds in the threshold matrices of the chromatic printing inks "cyan", "magenta", and "yellow" being occupied with thresholds lying outside the threshold range;

relevant thresholds are selected in the threshold matrices dependent on the corrected color separation values; and the individual bit maps of the printing inks are generated by conversion of the selected relevant thresholds into control bits.

15. The method according to claim 14 wherein the relevant thresholds are selected equidistantly from the threshold range.

16. The method according to claim 15 wherein the lowest n thresholds are selected from the threshold matrices dependent on the respective color separation value C=M=Y=K=n.

17. The method according to claim 4 wherein matrix elements in the threshold matrices are occupied with thresholds such that distributed pixels are printed as raster points in raster meshes of the raster of the gray composite proof.

18. The method according to claim 4 wherein matrix elements in the threshold matrices are occupied with thresholds such that compact raster points composed of printed pixels arise in raster meshes of the raster of the gray composite proof.

19. The method according to claim 4 wherein the thresholds in the threshold matrix of the printing ink "black" are selected such that at least some printed pixels of the printing ink "black" lie over printed pixels of the chromatic printing inks "cyan", "magenta" and "yellow" in raster meshes of the raster of the gray composite proof.

20. The method according to claim 19 wherein for a color separation value of the printing ink "black" of 50%, the thresholds in the threshold matrix of the printing ink "black" are selected such that approximately half of the printed pixels of the printing ink "black" lie over the printed pixels of the chromatic printing inks "cyan", "magenta" and "yellow" in the raster meshes of the gray composite proof and the remaining printed pixels of the printing ink "black" lie on positions in the raster meshes that are not occupied by printed pixels of the chromatic printing inks "cyan", "magenta" and "yellow".

21. The method according to claim 1 wherein decorative colors that cannot be reproduced in the color printing by the chromatic printing inks "cyan", "magenta" ad "yellow" are additionally taken into consideration in the printing of the gray composite proof.

22. The method according to claim 21 wherein the raster function of the decorative color corresponds to the raster function of the printing ink "black".

23. The method according to claim 1 wherein:

the color separation values of a decorative color are converted into corrected color separation values;

control bits of a further individual bit map are generated from the corrected color separation values according to a raster function; and control bits of the individual bit map of the decorative color are united with the control bits of the individual bit maps of the other printing inks "cyan", "magenta", "yellow" and "black" to form an overall bit map.

24. The method according to claim 23, wherein the raster function of the decorative color corresponds to the raster function of the printing ink "black".

25. The method according to claim 21 wherein for correction of color separation values of a decorative color, color separation values of the printing inks "cyan", "magenta", "yellow" and "black" that approximately reproduce the decorative color are determined for the color separation values;

the color separation values of the printing inks "cyan", "magenta", and "yellow" are reduced according to correction factors;

equivalent gray scale values $G_S$ are formed by addition of the reduced color separation values; and the corrected color separation values $S^*$ of the decorative color are determined from the equivalent gray scale values $G_S$ and the color separation values $K_S$ of the printing ink "black" according to the equation $$S^* = (G_S + K_S) + (K_S \times G_S).$$

26. A method for producing a rastered gray composite proof for advance monitoring of color printing of a color image, comprising the steps of:

generating color separation values of color separations "cyan", "magenta", "yellow" and "black" of said color image;

correcting gray scale values to be recorded on the gray composite proof to different percentage parts for the color printing compared to gray scale values of chromatic printing inks "cyan", "magenta" and "yellow" represented by the color separation values, said different percentage parts respectively corresponding to subjectively sensed brightness impressions of the chromatic printing inks "cyan", "magenta" and "yellow" with reference to printing ink "black";

converting the color separation values of the chromatic printing inks "cyan", "magenta" and "yellow" according to different raster functions into control bits in the form of three individual bit maps allocated to the pixels such that the recorded pixels of the chromatic printing inks "cyan", "magenta" and "yellow" lie next to one another on the recording material;

combining the individual bit maps of the chromatic printing inks "cyan", "magenta" and "yellow" to form an overall bit map; and driving a recording device with the control bits of the overall bit map for recording the gray composite proof on the recording material, the color values of the chromatic printing inks "cyan", "magenta", "yellow" being united to brightness-equivalent gray scale values, and the control bits of the bit map determining during the recording whether the pixels are or are not recorded as raster points or parts of a raster point.

* * * * *